United States Patent
Su et al.

(10) Patent No.: US 7,023,171 B2
(45) Date of Patent: Apr. 4, 2006

(54) INTEGRATED INVERTER FOR DRIVING MULTIPLE ELECTRIC MACHINES

(75) Inventors: Gui-Jia Su, Knoxville, TN (US); John S. Hsu, Oak Ridge, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 77 days.

(21) Appl. No.: 10/706,256

(22) Filed: Nov. 12, 2003

(65) Prior Publication Data

US 2005/0100330 A1   May 12, 2005

(51) Int. Cl.
*H02P 5/34* (2006.01)

(52) U.S. Cl. ............... 318/801; 318/727; 318/254; 318/138; 318/439; 363/42; 363/47

(58) Field of Classification Search ........... 318/254, 318/138, 439, 599, 811, 432, 434, 727, 800, 318/801, 700; 363/42, 47
See application file for complete search history.

(56) References Cited

U.S. PATENT DOCUMENTS

| | | | | |
|---|---|---|---|---|
| 4,213,517 A | * | 7/1980 | Ando | 187/296 |
| 4,392,099 A | * | 7/1983 | Kuniyoshi | 318/797 |
| 5,130,617 A | * | 7/1992 | Oshima et al. | 318/34 |
| 5,450,309 A | * | 9/1995 | Rohner | 363/71 |
| 5,657,217 A | * | 8/1997 | Watanabe et al. | 363/71 |
| 5,712,540 A | * | 1/1998 | Toda et al. | 318/46 |
| 6,078,173 A | * | 6/2000 | Kumar et al. | 324/158.1 |
| 6,486,632 B1 | * | 11/2002 | Okushima et al. | 318/599 |

OTHER PUBLICATIONS

New inverter-driven design and control method for two-phase induction motor drives, IEE Pro-Electr. Power Appl., vol. 143, No. 6, Nov. 1996, pp. 458-466.

* cited by examiner

*Primary Examiner*—Rina Duda
(74) *Attorney, Agent, or Firm*—Quarles & Brady LLP

(57) ABSTRACT

An electric machine drive (50) has a plurality of inverters (50a, 50b) for controlling respective electric machines (57, 62), which may include a three-phase main traction machine (57) and two-phase accessory machines (62) in a hybrid or electric vehicle. The drive (50) has a common control section (53, 54) for controlling the plurality of inverters (50a, 50b) with only one microelectronic processor (54) for controlling the plurality of inverters (50a, 50b), only one gate driver circuit (53) for controlling conduction of semiconductor switches ($S_1$–$S_{10}$) in the plurality of inverters (50a, 50b), and also includes a common dc bus (70), a common dc bus filtering capacitor ($C_1$) and a common dc bus voltage sensor (67). The electric machines (57, 62) may be synchronous machines, induction machines, or PM machines and may be operated in a motoring mode or a generating mode.

17 Claims, 3 Drawing Sheets

INTEGRATED INVERTER FOR DRIVING MULTIPLE ELECTRIC MACHINES

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The field of the invention is electrical machines including motors and generators and electronic controls for such machines.

BACKGROUND ART

There are applications that require multiple electric machine drives, such as electric or hybrid electric vehicles, where there is a main traction motor and one or more accessory motors or generators. To control the speed or power of these multiple motors or generators independently, each motor or generator requires an inverter. The use of an inverter enables the motor or generator run in either a motoring mode or a generating mode.

SUMMARY OF THE INVENTION

The invention relates to an integrated inverter control for controlling multiple electric machines. With the present invention, the number of components in a larger assembly of motors and generators can be reduced when one or more inverters share one or more of the following: a common dc bus, a dc bus filtering capacitor, a gate drive circuit, a processor control circuit, voltage sensors, current sensors, speed sensors or position sensors.

The invention provides advantages of lower cost and a smaller volume for drive systems in specific applications, such as the electric or hybrid vehicle. In this application, one machine serves as a main traction machine while other machines are used to power accessory devices on the vehicle.

These and other objects and advantages of the invention will be apparent from the description that follows and from the drawings which illustrate embodiments of the invention, and which are incorporated herein by reference.

DETAILED DESCRIPTION

Figure 1:
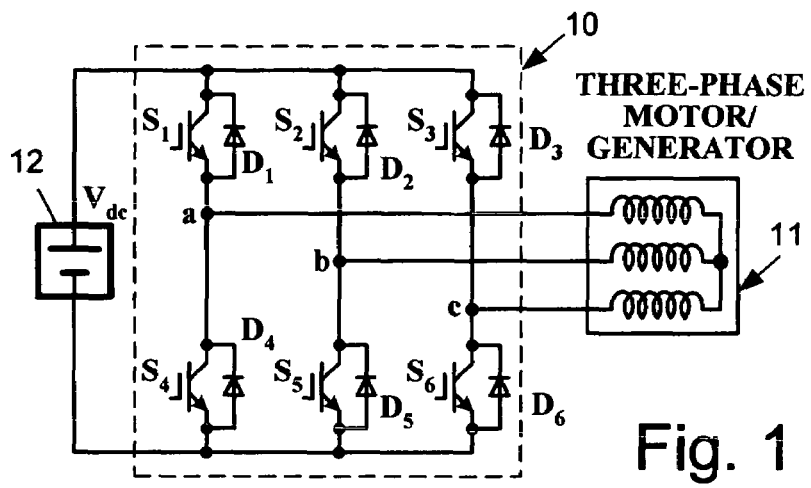
FIG. 1 is an electrical schematic of a three phase inverter of the prior art.

FIG. 1 illustrates an inverter 10 of the prior art having three parallel legs for phases a, b, and c and six semiconductor switches $S_1$–$S_6$, two switches per leg, for driving a three-phase motor/generator 11. Because the switches $S_1$–$S_6$ conduct current only in one direction, each switch has a diode $D_1$–$D_6$ connected in parallel, to allow currents to flow in the opposite direction when needed. The inverter is fed by a dc voltage from a dc source 12.

Figure 2:
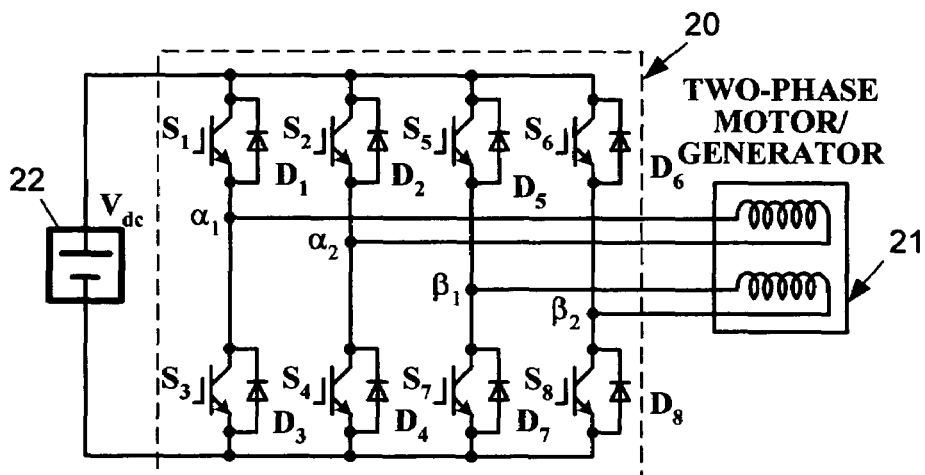
FIG. 2 is an electrical schematic of a four-leg inverter for controlling a two-phase motor/generator.

FIG. 2 shows a known inverter 20 with eight semiconductor switches $S_1$–$S_8$ in four parallel legs, two switches per leg, for driving a two-phase motor/generator 21. Diodes $D_1$–$D_8$ are provided for the same reasons as diodes $D_1$–$D_6$ in FIG. 1. A dc voltage bus voltage is provided by a dc source 21 as in FIG. 1.

Figure 3:
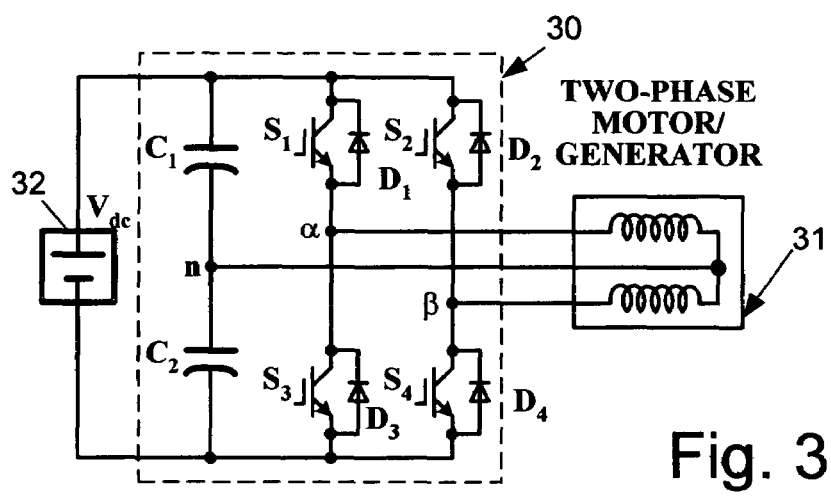
FIG. 3 is an electrical schematic of a two-leg inverter plus a capacitor leg for controlling a two-phase motor or generator.

FIG. 3 shows a known two-leg inverter 30 with four switches $S_1$–$S_4$ in two parallel legs with filtering capacitors $C_1$ and $C_2$ in a third parallel leg for driving a two-phase motor/generator 31 like the one shown in FIG. 2. Diodes $D_1$–$D_4$ are provided for the same reasons as the diodes in FIGS. 1 and 2. A dc bus voltage is provided by a dc voltage source 32 as described for FIGS. 1 and 2.

Figure 4:
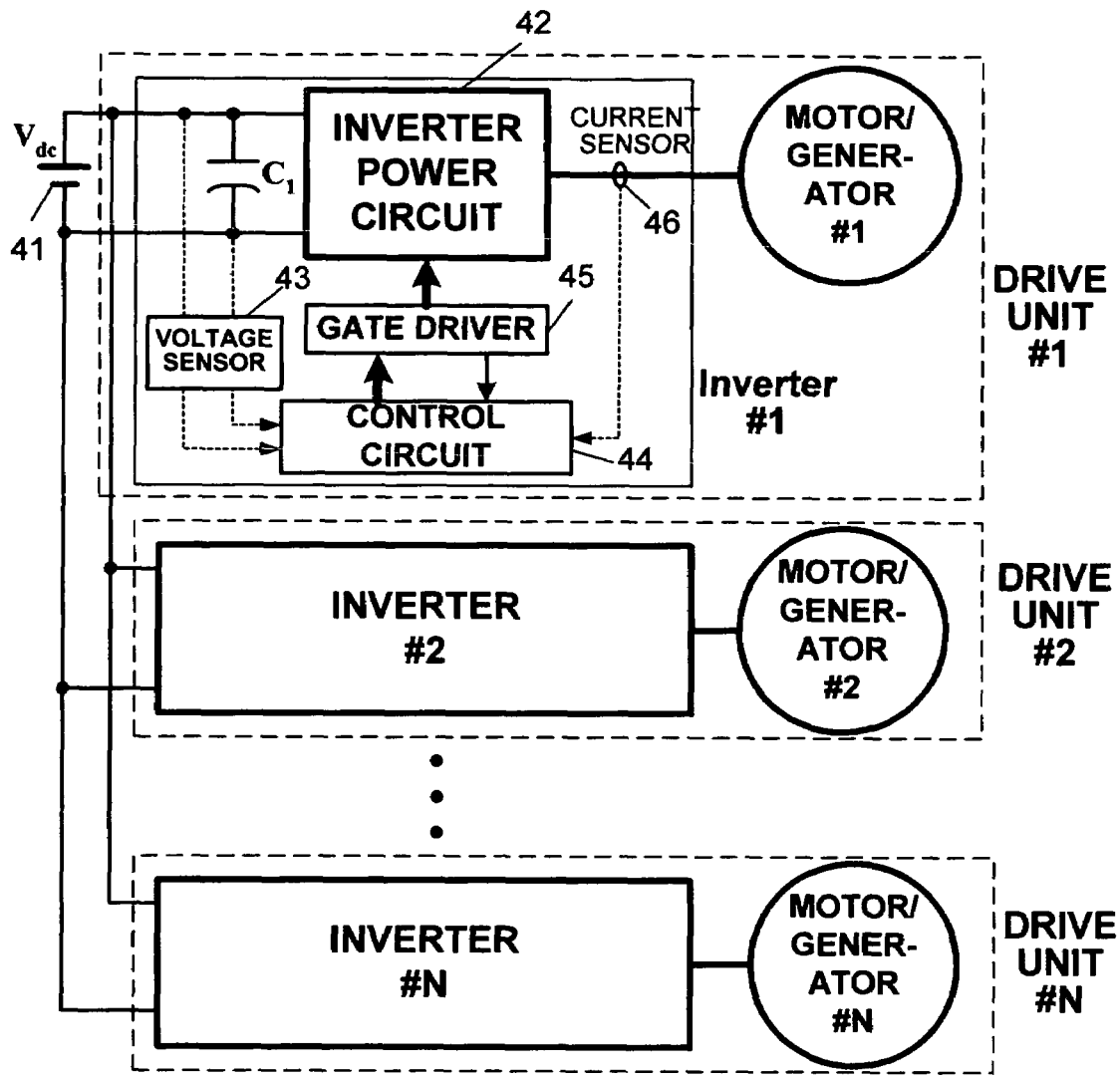
FIG. 4 is an electrical schematic of a multiple-motor or generator drive system in which each motor or generator is powered by a separate inverter and all inverters share a single dc source.

FIG. 4 shows a configuration of multiple-machine drives in which each machine #1, #2, through #N (a selected number) is powered by a separated corresponding inverter (#1, #2, through #N) and all the inverters receive dc power from a single dc source 41. Each individual drive unit #1, #2 through #N and inverter #1, #2, . . . #N has an inverter power circuit 42, a dc voltage input sensor 43, a filtering capacitor $C_1$ connected across the dc bus, and a control circuit 44 connected through gate drivers 45 to the inverter power circuit 42. A current sensor 46 is provided to sense the output current provided to the motor/generator unit #1. The inverter power circuit 42 includes power semiconductor switches $S_1$–$S_6$ for three phase voltages as shown in FIG. 1. Inverters #2 through #N can include the configurations for semiconductor switches shown in FIG. 1, 2 or 3.

Figure 5:
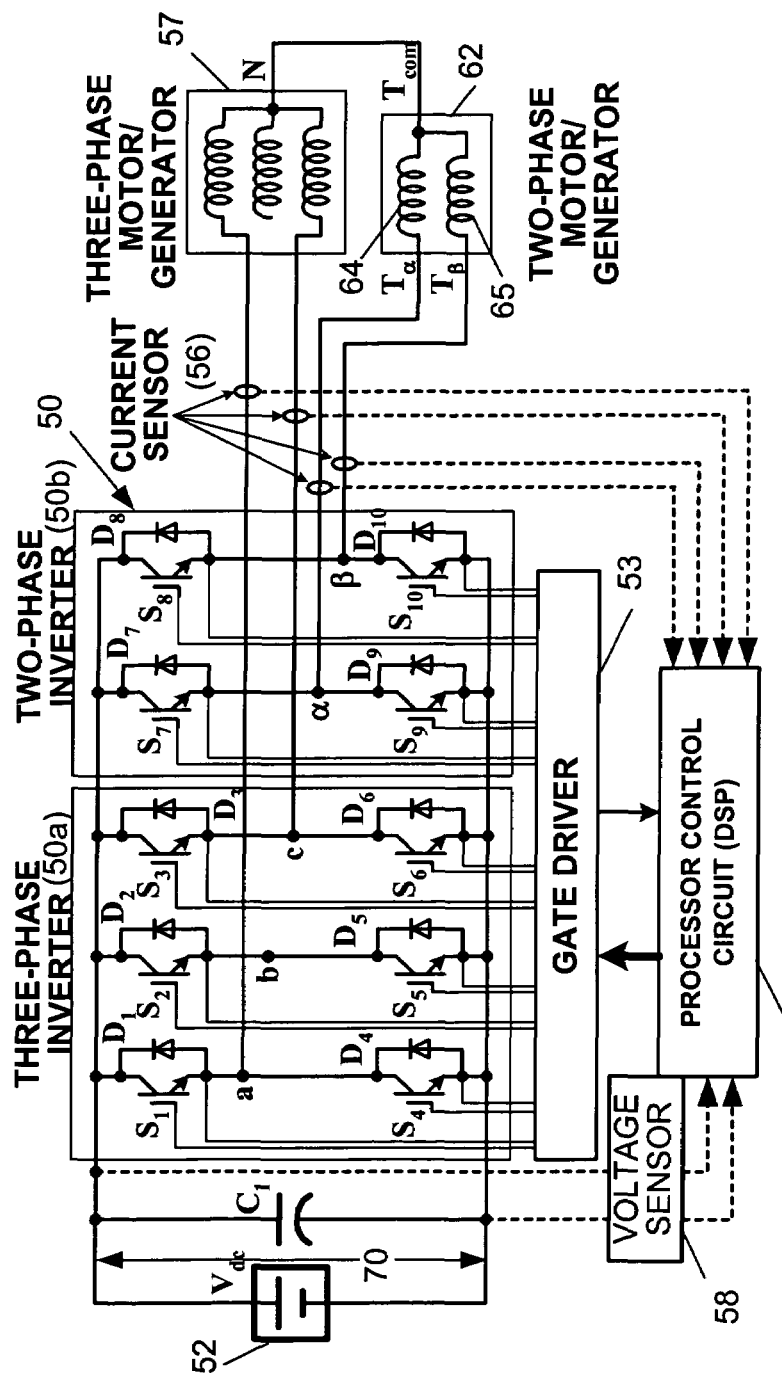
FIG. 5 an electrical schematic of a five-leg integrated inverter of the present invention for driving a three-phase motor or generator and a two-phase motor or generator.

FIG. 5 illustrates an integrated inverter control 50 of the present invention having a three-phase inverter 50a and a two-phase inverter 50b. The three-phase inverter 50a has three parallel legs for phases a, b and c with six semiconductor switches $S_1$–$S_6$ for driving a three-phase motor/generator 57. The two-phase inverter 50b also has two legs, α and β with four semiconductor switches $S_7$–$S_{10}$ for driving a two-phase motor/generator 62.

The inverter receives dc power from a dc source, 51, a filtering capacitor, $C_1$ is provided across the dc source input. In addition, a gate driver circuit 53 is provided to turn on or off the semiconductor switches, $S_1$–$S_{10}$ according to the control signals generated by the processor control circuit 54. A dc source 52 provides the dc bus voltage and this voltage is sensed through voltage sensor 58 which is electrically connected to processor control circuit 54.

The two-phase motor/generator 62 has two phase windings 64, 65, for phase-α and phase-β, and the two phase windings 64, 65 are connected at one end to form a common terminal, $T_{com}$, with the other ends remaining separated to form two independent terminals, $T_α$ and $T_β$.

The first three legs, a, b and c of the inverter consisting of the switches $S_1$–$S_6$ forms a three-phase inverter 50a, which is controlled by pulse width modulation method of a type known in the art to provide three sinusoidal currents to the three-phase motor/generator 57. The three sinusoidal currents have a phase shift of one hundred and twenty (120) electrical degrees relative to each other. The remaining two legs, α and β are connected to the independent terminals $T_α$, $T_\beta$ of the two-phase motor/generator 62, respectively. The common terminal, $T_{com}$ is connected to the neutral point, N of the three-phase motor/generator 57. The two phase legs, α and β, through pulse width modulation, provide two sinusoidal currents to the two-phase motor/generator 62. The two phase currents have a phase shift of ninety (90) electrical degrees relative to each other. The sum of the two phase currents will split evenly into three parts and each part flows through one of the phase windings of the three-phase motor/generator 57 and the associated phase leg, a, b, c of the three-phase inverter 57 as the return paths. The two-phase motor/generator 62 currents are therefore zero-sequence components to the three-phase motor/generator 57 and will not affect the operation of the three-phase motor generator 57 because the zero-sequence currents will not produce torque. As a result, the torque-producing currents of the two motors/generators 57, 62 can be controlled independently from each other.

A single control circuit, typically based on a microprocessor or digital signal processor (DSP) 54, may be programmed to execute control algorithms for the two motors/generators 57, 62. With a proper control algorithm, the motors/generators 57, 62 can be run in either motoring mode, i.e., providing power to the motor shaft, or generating mode, in which power is transferred from the motor shaft to the inverter dc source. The motor/generator machines 57, 62 can be ac synchronous machines, ac induction machines or permanent magnet machines. Voltage and current sensors 58, 56 may be used, if necessary, to measure the dc bus voltage and motor/generator currents, respectively. Other sensors such as speed sensors, position sensors or thermocouples may also be employed.

The integrated inverter of the present invention can be extended to drive more than two motors/generators. For each additional two-phase motor/generator, two inverter phase legs would be added to the dc bus 70. The two phase legs drive the two independent motor terminals while the common terminal is connected to the neutral point, N, of the three-phase motor/generator 57. When there are two or more two-phase motors/generators 62, the common terminals of any two of them can be tied together and may or may not be connected to the neutral point, N, of the three-phase motor/generator 57.

Thus, with the present invention, the number of components in a larger assembly of motors and generators can be reduced by sharing a common dc bus, a dc bus filtering capacitor, a gate drive circuit, a processor control circuit, voltage sensors, current sensors, speed sensors or position sensors.

This has been a description of several preferred embodiments of the invention. It will be apparent that various modifications and details can be varied without departing from the scope and spirit of the invention, and these are intended to come within the scope of the following claims.

We claim:

1. An electric machine drive comprising:
   a plurality of inverters for controlling respective electric machines;
   a common control section for controlling the plurality of inverters; and
   wherein a first one of the plurality of inverters is a three-phase inverter for controlling a three-phase machine and a second one of the plurality of inverters is a two-phase inverter for controlling a two-phase machine; and
   wherein a neutral point (N) of the three-phase motor and a common terminal (Tcom) of the two-phase motor are electrically connected to each other.

2. The electric machine drive of claim 1, wherein the common control section further comprises only one microelectronic processor for controlling the plurality of inverters.

3. The electric machine drive of claim 2, further comprising only one gate driver circuit for controlling conduction of semiconductor switches in the plurality of inverters, said gate driver circuit being controlled by said one microelectronic processor.

4. The electric machine drive of claim 3, wherein the semiconductor switches are controlled to generate pulse width modulated signals to one or more electric machines.

5. The electric machine drive of claim 1 or 2, further comprising a common dc bus for supplying dc voltage to the plurality of inverters.

6. The electric machine drive of claim 5, wherein the common control section further comprises only a single voltage sensor for sensing voltage on the common dc bus.

7. The electric machine drive of claim 1, wherein the common control section is connected to a single set of phase current sensors for sensing current output from the plurality of inverters.

8. The electric machine drive of claim 1, further comprising a third one of the plurality of inverters which is a two-phase inverter for controlling a two-phase machine.

9. The electric machine drive of claim 1, wherein a respective one of the electric machines is an ac synchronous machine.

10. The electric machine drive of claim 1, wherein a respective one of the electric machines is an ac induction machine.

11. The electric machine drive of claim 1, wherein a respective one of the electric machines is a permanent magnet machine.

12. The electric machine drive of claim 1, wherein a respective one of the electric machines is operated as a motor.

13. The electric machine drive of claim 12, wherein the respective one of the electric machines is also operated as a generator.

14. An electric machine drive comprising:
   a plurality of inverters for controlling respective electric machines;
   a common control section for controlling the plurality of inverters, wherein the common control section further comprises only one microelectronic processor for controlling the plurality of inverters; and
   wherein a first one of the plurality of inverters is a three-phase inverter for controlling a three-phase machine and a second one of the plurality of inverters is a two-phase inverter for controlling a two-phase machine; and
   wherein a neutral point (N) of the three-phase motor and a common terminal (Tcom) of the twophase motor are electrically connected to each other.

15. The electric machine drive of claim 14, further comprising only one gate driver circuit for controlling conduction of semiconductor switches in the plurality of inverters, said gate driver circuit being controlled by said one microelectronic processor.

16. The electric machine drive of claim 14, wherein the microelectronic processor is a digital signal processor.

17. The electric machine drive of claim 14, wherein the respective electric machines include a main traction machine and an accessory machine in a vehicle for transporting at least one person.

* * * * *